(12) United States Patent
Gullo et al.

(10) Patent No.: US 6,684,349 B2
(45) Date of Patent: Jan. 27, 2004

(54) RELIABILITY ASSESSMENT AND PREDICTION SYSTEM AND METHOD FOR IMPLEMENTING THE SAME

(75) Inventors: Louis J. Gullo, Boynton Beach, FL (US); Leon Musil, Phoenix, AZ (US); Bruce G. Johnson, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 539 days.

(21) Appl. No.: 09/765,195

(22) Filed: Jan. 18, 2001

(65) Prior Publication Data

US 2002/0078403 A1 Jun. 20, 2002

Related U.S. Application Data

(60) Provisional application No. 60/176,955, filed on Jan. 18, 2000.

(51) Int. Cl.[7] ................................................. G06F 11/00
(52) U.S. Cl. ............................ 714/47; 701/29; 702/184
(58) Field of Search ........................ 714/47, 26; 701/29, 701/30; 702/186, 184, 187

(56) References Cited

U.S. PATENT DOCUMENTS

| | | | | |
|---|---|---|---|---|
| 6,067,486 A | * | 5/2000 | Aragones et al. | ............ 701/29 |
| 6,349,268 B1 | * | 2/2002 | Ketonen et al. | ............ 702/130 |
| 6,415,395 B1 | * | 7/2002 | Varma et al. | .................. 714/37 |
| 6,490,543 B1 | * | 12/2002 | Jaw | .............................. 702/184 |
| 2002/0177989 A1 | * | 11/2002 | Alvarez et al. | ................ 703/22 |
| 2003/0154052 A1 | * | 8/2003 | Samata et al. | ............... 702/184 |

OTHER PUBLICATIONS

"In–Service Reliability Assessment and Top–Down Approach Provides Alternative Reliability Prediction Method" by Lou Gullo, 1999 Proceedings Annual Reliability and Maintainability Symposium, pp. 365–377 http://rac.iitri.org/prism.

* cited by examiner

*Primary Examiner*—Robert Beausoliel
*Assistant Examiner*—Marc Duncan

(57) ABSTRACT

A system and method for reliability assessment and prediction of end items is provided herein. A reliability assessment program (RAP) in accordance with the present invention provides a reliability assessment of the new equipment and/or parts designed for in-field use by assessing the similarities and differences between the new equipment and the predecessor equipment. Predecessor end item field failure data is collected and analyzed to compare the degree of similarity between the predecessor fielded end item and the new design. Based on this comparison, an appropriate method of assessment is determined, for example, a similarity analysis process or a failure cause model. Both methods use models for comparison and generate an appropriate report expressing the failure rate prediction of the new design and/or the mean-time-between-failure (MTBF).

33 Claims, 5 Drawing Sheets

RELIABILITY ASSESSMENT AND PREDICTION SYSTEM AND METHOD FOR IMPLEMENTING THE SAME

This application claims the benefit of provisional application No. 60/176,955 filed Jan. 18, 2000.

FIELD OF INVENTION

The present invention relates, generally, to a system and method for assessing and predicting failure rates of end items and, in particular, to reliability assessment and prediction of new end items and their respective components and parts based on in-service reliability data for predecessor/similar end items.

BACKGROUND OF THE INVENTION

Reliability assessment and prediction of failure rates of electrical and mechanical parts is a valuable tool used by a wide array of industries, such as, manufacturers and distributors of automobiles, high-end electrical equipment, household and industrial mechanical equipment, military contract goods, space and space industry equipment, and aircraft and avionics systems. Reliability predictions are often used to assist management in deciding appropriate maintenance schedules, replacement parts needs for immediate use, end-item estimated lifetime, end-item projected costs, and safety analyses.

In the aircraft and avionics industry, the methodology historically used to prepare reliability predictions and support safety analyses has been based on MIL-HDBK-217 ("Military Handbook 217"). MIL-HDBK-217 was created over two decades ago by the U.S. Department of Defense ("DOD") to be used primarily for predicting reliability for comparative purposes. Over the years, observed data relating to various parts, components, and equipment was compiled from a wide range of sources to form the handbook. The handbook contains numerous tables and charts which can be used for predicting the average mean time between failure ("MTBF") of various electrical parts and components. MIL-HDBK-217 was known industry-wide as the standard methodology available for reliability assessment. However, the recent explosion of technology has made the task of updating the number and types of new components and parts nearly impossible. Many industries began looking elsewhere, outside of MIL-HDBK-217, for prediction analyses because the data was either not available for the part of interest or it was grossly outdated. Recognizing that industries were no longer relying on the handbook and that updating was an insurmountable project, the DOD decided to stop updating the handbook in the mid 1990s.

Even though the information contained in MIL-HDBK-217 is outdated, the handbook is still widely used (because a better alternative has yet to be introduced). To accommodate for the deficiencies in updating the handbook, e.g., many of the parts, such as integrated circuits and/or chips, are not listed in the handbook, extensive extrapolation and cross-referencing to older parts is required. This technique poses many problems. For example, it is extremely difficult to determine the applicability and commonality of the older parts listed in the handbook to the new complex integrated circuits. Thus, in many cases, the uncertainty factor of the extrapolated data makes the reliability of the analyses too low.

Unfortunately, even when modified with valid field data, MIL-HDBK-217 consistently yielded a very conservative prediction that did not accurately reflect actual in-service equipment performance. Again, these conservative predictions are due largely to the fact that MIL-HDBK-217 was intended to be used as a uniform method for predicting reliability for comparative purposes, and was not initially intended for predicting "in-use" reliability. Overly conservative predictions result in a cost burden to the end user by, for example, unnecessarily indicating a high spare stock requirement, and purchasing unnecessary parts warranty provisions.

A second methodology historically used in the aircraft and avionics industry entails a parts count reliability prediction process which is based on internally developed component failure rates. The failure rates are calculated from millions of device operating hours on commercial aircraft. This process, however, is limited to electrical and electromechanical part types and does not directly reflect mechanical, process, or design-related failure mechanisms.

Another methodology, distributed by Reliability Analysis Center (RAC), is a software tool called PRISM® and was initially developed to overcome some of the inherent limitations in MIL-HDBK-217. This approach starts at the bottom (the piece-part level) and adds up all the components to eventually obtain a top level model. A bayesian equation is factored in to account for field data.

In general, the traditional prediction methodologies assume that failures are only caused by component faults, defects, or deficiencies and are insufficient to meet current and future program needs. This "bottoms-up" approach to reliability focuses on parts as the single source for unreliability of end products. Historically, this has been a reasonable approach due to the relatively low reliability of components in comparison to the impact of higher level assembly process, test, transportation and storage, and human error of application. However, the part defect contribution to the total failure rate has been exacerbated in the harsh environment of avionics and, in some cases, military applications.

Another methodology recently developed by the University of Maryland, called the "physics of failure" approach, focuses on failure models based on the actual physics of the failure, e.g., a solder joint life model based on materials, physical dimensions, and usage environment. This approach is in its infancy in terms of the number of failure models which have been developed as compared to the number needed to perform a successful reliability prediction. In addition, the randomness of all processes, both in the equipment design/build process as well as the processes of all part/material suppliers poses potential problems to this approach. Nonetheless, physics of failure predictions can be useful tools in understanding failure mechanisms and minimizing their risks of occurrence; however, it is not foreseeable that this approach will mature enough to accurately predict in-field reliability of equipment.

Accordingly, an improved reliability prediction system and method is needed to meet a dynamic parts requirement. In addition, a methodology is needed that evaluates data collected from in-field performance.

SUMMARY OF THE INVENTION

The present invention overcomes the prior art problems and provides an in-service reliability assessment and prediction system for end items. The system includes a field data source, a new component data source, and a processing means for assessing the similarities and differences between a new equipment design and predecessor equipment.

The methodology of the present invention provides an assessment of reliability of the new equipment by comparing a fielded end item design to a new design, determining the degree of similarity between the two designs, and determining an appropriate method of assessment based on the degree of similarity.

In one embodiment, a similarity analysis process is performed which includes identifying characteristic differences between the fielded end item and the new design, quantifying the impact of each identified difference, compiling the data, and determining the field failure rate of the new design.

In another embodiment, an alternate approach to the similarity analysis is performed which includes determining the level of assessment to be performed, determining the product group for which expected failure rates are used, identifying factors impacting the field failure rate, identifying characteristic differences between the fielded end item and the new design, quantifying the impact of the characteristic differences, compiling the data, and determining the field failure rate of the new design.

BRIEF DESCRIPTION OF THE DRAWINGS

These and other features, aspects and advantages of the present invention will become better understood with reference to the following description, appending claims, and accompanying drawings where:

DETAILED DESCRIPTION OF THE PRESENT INVENTION

1. Definitions

Figure 1:
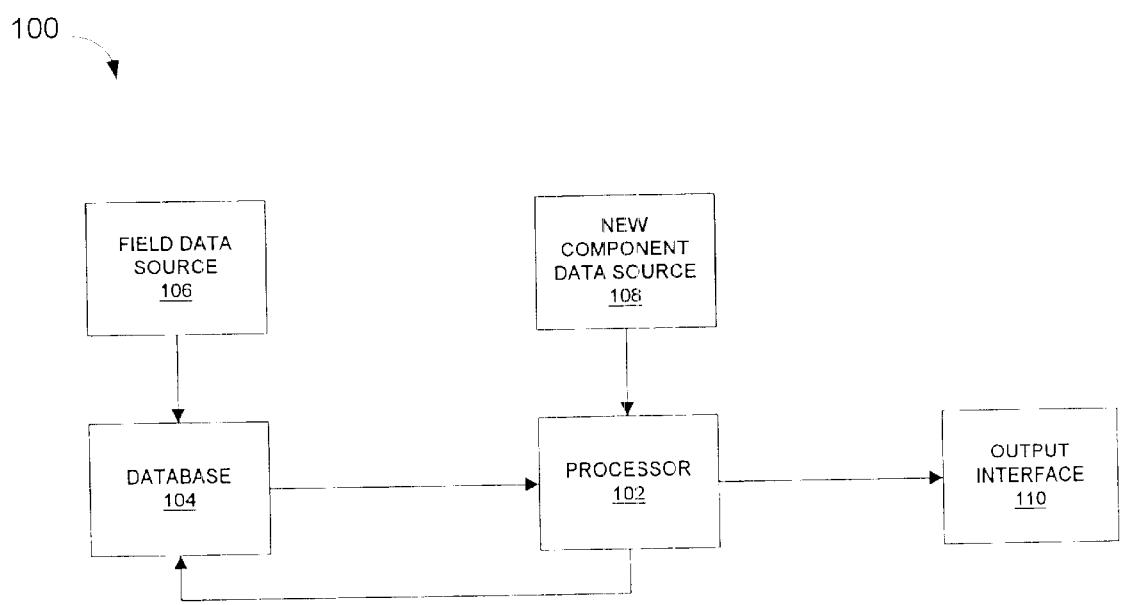
FIG. 1 illustrates, in block format, a reliability assessment program (RAP) system according to one embodiment of the present invention.

The following definitions apply to words and/or terms used herein, and are offered to clarify their use and not as a means of limitation:

ATTRIBUTES: Characteristics which may affect the failure rate of the end item, such as, but not limited to, physical, process, and environmental.

CCA: Circuit card assembly; generally consists of a number of electrical/electronic parts mounted on a printed wire board (PWB) and connected to perform specific output function(s).

END ITEM FAILURE CAUSES: Failures of an LRU that were not related to a defective component, e.g., customer induced damage/contamination, external induced stress/out-of-spec condition, manufacturing workmanship/plan errors, interconnection problems/resetting CCAs, hardware/software design problems, adjustments/calibrations, and intermittent failures/data errors.

FIELD FAILURE RATE: The reciprocal of the MTBF and generally expressed in terms of failures per hours.

IN-FIELD; IN-SERVICE: (used interchangeably) The duration of time during which an LRU is placed in the physical environment for which it had been designed and built to function in.

HART: Honeywell Avionics Reporting Tool; a software package which retrieves and gathers QDS data into a user-readable format displaying information relating to an end item. HART is configured to cross-reference a unique Honeywell part number with airlines using that part number and display, e.g., failure reports and operating hours for that part number.

LRU: Line replaceable units; the end item used in-field which may consist of a single device having multiple parts, components and/or sub-assemblies.

MTBF: Mean-time-between-failure; an estimate of the average time, generally in unit operating hours, that a component or part works without failure, i.e., the length of time a user may reasonably expect a device, system, or part to work before an incapacitating fault occurs. MTBF is calculated by dividing the total operating time for like units by the total number of failures that occurred during these unit's operating hours. The number of failures is obtained by counting the number of valid field returns and then subtracting the number of no-fault-found conditions.

OPERATING HOURS: The unit of time that is used in the computation of unit field reliability. Defined as the total power-on time accumulated by the unit (i.e., the flight time plus the power-on time during ground operations). The power-on time during ground operations is included to account for the electrical stresses on the circuits within the unit.

QDS: Quality Data System; a database storing raw field data relating to parts, components, and devices received from various sources, e.g., airline service reports.

RELIABILITY ASSESSMENT: An estimate of the expected reliability of equipment and/or parts made at any stage of design, development, production, and in-service cycle prior to the availability of complete failure data for the entire lifetime.

RELIABILITY ASSESSMENT PROGRAM (RAP): A collection of plans, procedures, processes, tools, and the like, used in a structured manner to conduct reliability assessment of equipment and/or parts.

TOP-DOWN APPROACH: This approach is performed to assess the predecessor LRU field data down to the root causes of the LRU failure by assessing the failure rates of the individual parts, components, and/or sub-assemblies within the LRU.

2. Detailed Description of Exemplary Embodiments

The present invention relates to an in-service reliability assessment and prediction system and method for end items and their respective components and parts. The present system and methodology provides a reliability assessment of new equipment and/or parts designed for in-field use by assessing the similarities and differences between the new equipment and the predecessor equipment(s) to be replaced.

The present invention is particularly suited for use in connection with complex mechanical and electrical systems, such as aircraft and avionics systems. As a result, the exemplary embodiments of the present invention are described in that context. It should be recognized, however, that such description is not intended as a limitation on the use or applicability of the present invention; but instead is provided as illustrative of various embodiments of the invention, including its best mode.

FIG. 1 illustrates, in block format, a reliability assessment program (RAP) system 100 in accordance with one embodiment of the present invention. RAP system 100 includes a processor 102, a memory 104 having a database, a source of field data 106, a source of data relating to new components 108, and an output interface 110. Processor 102 may include any suitable processing system, such as a computer like a mainframe, a workstation, a microprocessor, or a desktop computer. Processor 102 is configured to perform various analytical and management tasks, such as analyzing data for new components received from the new component data source, comparing data for new components to data stored in the memory 104 database, and managing the database in memory 104.

Memory 104 may include any appropriate memory system for storing the database. In the present embodiment, memory 104 includes a mass storage system, such as a hard drive array, for storing the information in the database, and a random access memory (RAM) for high speed memory accesses. Any suitable memory system may be implemented, however, to accommodate the desired storage and access characteristics of RAP system 100.

Field data source 106 provides data relating to components that have been deployed. For example, in the present embodiment, field data source 106 includes a system for collecting field failure data, such as the Quality Data System (QDS) used by Honeywell International Inc., to store field failure history for any given end item part number. Field data source 106 may include other appropriate systems, such as the Performance Tracking System used by Honeywell International Inc., to gather flight hours, end item removals and confirmed failures, and the Honeywell Avionics Reporting Tool (HART) used to access the field failure database.

Similarly, new component data source 108 provides data relating to the new component for which reliability assessment is desired. The new component data source 108 may include any appropriate source of data relating to the new component, such as design drawings, part lists, or any other suitable source of information. In the present embodiment, new component data source 108 provides physical model data in various fields for analysis, such as identification of active components, passive components, interconnects, solder joints, and any other appropriate potential failure causes. Other non-physical data may be provided by new component data source 108 as well, such as technological maturity of the component, the design process, extent of testing, manufacturing effectiveness, or other suitable information.

Output interface 110 provides the results generated by processor 102. The output interface 110 may generate any desired form of results, such as a reliability assessment report, a breakdown of the analysis performed, reliability of various subcomponents, and the like. In the present embodiment, the output interface 110 suitably generates a projected MTBF, a quantitative analysis comparing the new component to one or more known older components, and the expected failure rate of the new component.

Figure 2:
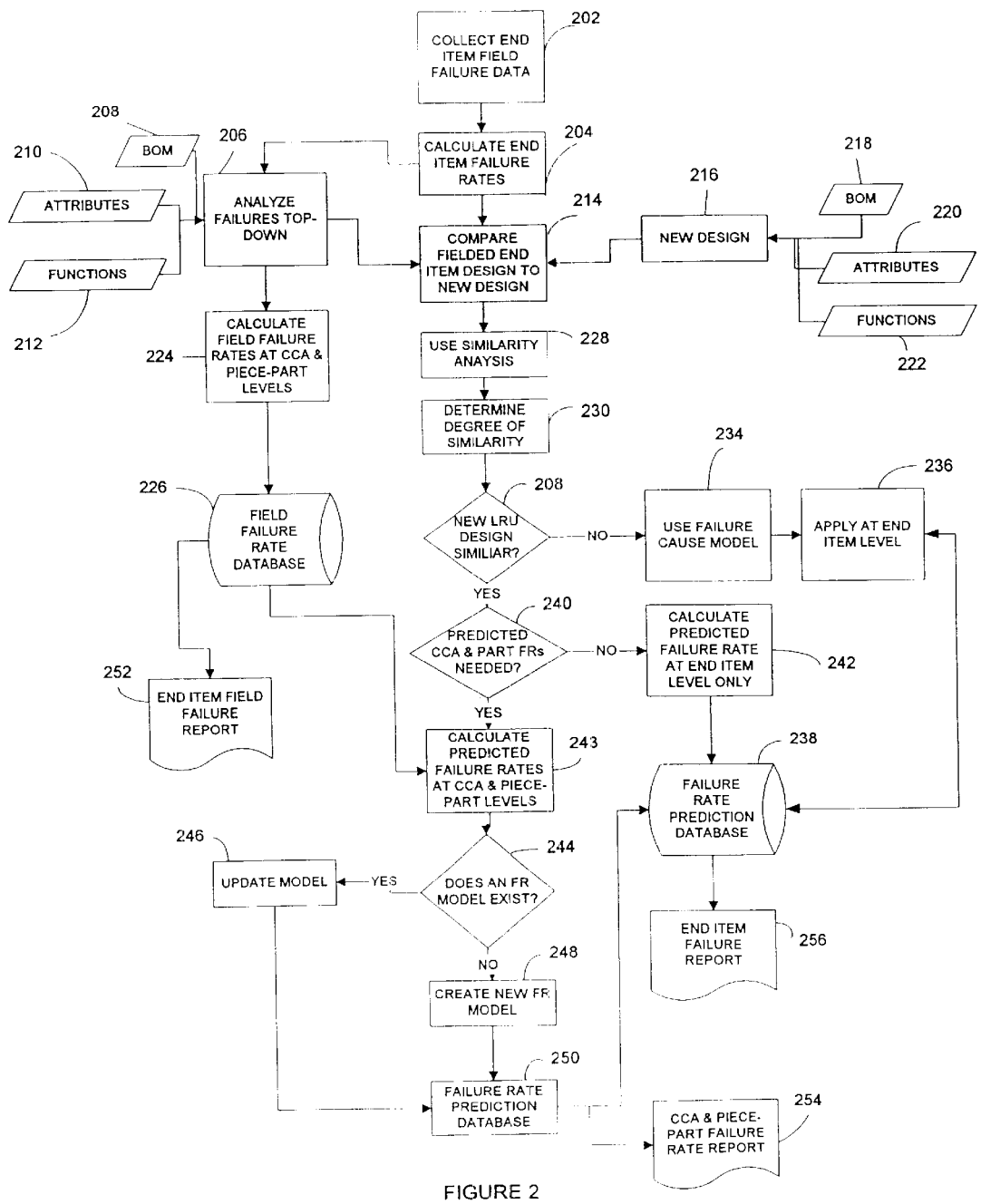
FIG. 2 illustrates an exemplary flow diagram of a reliability assessment program (RAP) system according to one embodiment of the present invention.

Referring now to FIG. 2, a flow diagram of a reliability assessment program (RAP) system 200 in accordance with one embodiment of the present invention is shown. System 200 is preferably used to perform reliability assessments in the design-production-use cycle of each new product, component, part, and/or system. For example, system 200 may be conducted at one or more of the following times: at the time of product proposal; at completion of a preliminary design; at completion of a detailed design; at completion of a first article inspection (FAI); and at periodic intervals during in-service product operation.

Initially, end item field failure data for known older components is collected (step 202) from field data sources (e.g., field data source 106 of FIG. 1) and stored in a database (e.g., database 104 of FIG. 1) for subsequent retrieval. Collecting end item data may involve accumulating field data from numerous support centers (e.g., Honeywell Product Support Centers). In this particular embodiment, field data may include airline repair data for the end items. For instance, the following tasks may be performed in this initial procedure and will be discussed in detail below: (1) field data collection; (2) field data verification; (3) failure classification; and (4) aircraft flight and operating hour data collection, or the equivalent.

1. Field Data Collection

Data may be collected from repair center reports. This field failure data is typically recorded (entered and stored on a database) in, for example, a universally retrievable database, such as the Quality Data System (QDS) used by Honeywell International Inc. QDS stores field failure history for any given end item part number across many maintenance shops and end customers.

The QDS database may be accessed using the internet or a company intranet to obtain customer information, aircraft information about field failures, part information associated with repairs and repair locations. The Honeywell Avionics Reporting Tool (HART) or the equivalent, may be used to initially access the QDS database to determine if predecessor data exists in QDS for any given end item part number that may be considered similar to the new design. When it is determined that some data exists for the predecessor end items, the next steps typically are to determine how much data exists and how accurate it is. Once HART, or the equivalent, is used to determine the general state of the field data, other software queries may be run to query and sort the QDS database in a desired format (e.g., MS EXCEL, MS ACCESS and BRIOQUERY® software).

2. Field Data Verification

The field data is preferably verified before it is considered acceptable for use in a reliability assessment. For example, several database record fields may be examined and verified to be accurate before the in-service field data is considered valid such as, aircraft operator name, type, ID numbers, equipment removal date, failure type, device type, and failure environment anomalies. Verifying the field data is accurate helps to ascertain end item failure cause failure rates can be calculated with a high degree of reliability.

The completeness and accuracy of the field data is important to ensure continuity from unit failures, through the CCA (circuit card assembly), to the component level. To avoid "shotgunning" part replacements to expedite repairs, which can obscure the true cause of part failure, a failure analysis on all suspect defective parts is preferred. Of course, unnecessary failure analysis on non-defective parts may be wasteful and costly; therefore, engineering judgement and/or appropriate algorithms may be useful in evaluating the failures to determine the defective part.

3. Failure Classification

Preferably, only relevant failures are used in the computation of the MTBF. Relevant failures typically occur during normal in-service operation. The failure is generally confirmed upon return to the repair facility and verified either by repeating the failure mode or by physical or electrical evidence of the failure.

4. Aircraft Flight and Operating Hour Data Collection

In the aircraft and avionics industry, field flight hour data collection may also be an important variable to consider. Software, such as AVSOFT AVIATION SOFTWARE SYSTEMS®, may be used to extract the flight hours used for reliability calculations and to correlate aircraft operator removals. The airlines and reporting services, such as ACAS Product Dispatch from Avsoft Systems, typically report time in "unit flight hours", which is the time period between the aircraft "wheels OFF" and "wheels ON". The flight hours may be correlated to each aircraft operator, aircraft type, aircraft model, and aircraft identifier, such as aircraft registration number (i.e., tail number), manufacturer's serial number, and fuselage number.

The Performance Tracking System (PTS), or the equivalent, may be used to gather flight hours and operating hours data. For example, Honeywell International Inc. receives PTS data supplied directly from its customers to its field representatives. PTS data may include some customer shop failure data which is not generally included in QDS. HART, or the equivalent, is suitably capable of retrieving information stored on AVSOFT AVIATION SOFTWARE SYSTEMS® and PTS databases.

The data collected from the field is used to calculate end item failure rates and MTBFs (step 204). These calculations may be performed, for example, using software, algorithms, and manual computation, or any combination thereof. For example, HART is generally configured to perform some or all of the computations, such as calculating MTBF. As previously defined, MTBF is the total operating time for like units divided by the number of failures that occurred during these unit's operating hours.

The top-down approach (step 206), or the like, may be performed to assess the predecessor LRU (line replaceable unit) field data down to the root causes of the LRU failures. For instance, the LRU may comprise one or more subassemblies which each carry their own failure rate. Thus, the top-down approach may be applied at the LRU level to predict reliability at the piece-part level, as necessary.

The top-down approach initial step is to collect the LRU data from the field, which may be accomplished several ways. Field data is collected using HART, QDS, and other data sources (step 202) which can be used in the top-down approach. In addition, further data may be considered, such as the parts list for the end item (step 208), attributes (step 210), and end item function (step 212). The "bill of material" (BOM) identifies the individual or collective parts which comprise the end item. This data is useful when reliability down to the piece-part level is desired. Attributes, such as characteristics that may affect the reliability of the end item may also be considered. There are numerous characteristics which may be helpful in predicting reliability such as, but not limited to, design process data, manufacturing process data, product specific data, environment, packaging, and workmanship. The intended or in-service function of the end item is also useful data when predicting reliability.

The top-down approach proceeds with the calculation of the field failure rates and MTBFs of the predecessor LRU at the CCA (circuit card assembly) and piece-part levels (step 224). The MTBF is determined at the CCA level by multiplying the total LRU operating hours by the number of those CCAs in the LRU, and then dividing by the number of CCA failures. The piece-part level MTBFs are generally not unique to each piece-part or component part number. Rather, RAP system 200 determines piece-part level MTBFs that are unique to each LRU analyzed. Piece-part MTBF can be computed at several levels and may assume a hierarchy. An exemplary piece-part level hierarchy may include: at the highest level, piece-part types which include active and passive parts (MTBF is computed for each of these elements); the next level is specific-type piece-parts, e.g., resistors (MTBF is computed for all resistors in the LRU); the third level is the piece-part or component part number MTBF; the fourth level is the MTBF at the CCA level; the final piece-part level is the failure mode MTBF of each part and typically requires extensive failure analysis to determine the root cause failure mechanisms. If failure rate for each of the failure mechanisms is not or cannot be determined, there may be a category for unknown failure mechanisms or intermittent failures that cannot be duplicated.

The summation of the failure rates of the failure mechanisms may not always equal the total LRU failure rate. This is known as "top-down disconnect" since there is a one-to-many relationship between the LRU failure and the failure mechanisms inside the LRU, or in other words, where the total number of observed CCA failures is greater than the observed number of a single end item (LRU) failure. The disconnect may occur when an attempt is made to apportion the failures top down. For example, an LRU failure is counted as a single failure, but there may be two CCAs that failed within the LRU, and four failure mechanisms within both CCA circuitry.

To resolve the top-down disconnect and avoid making resultant unrealistic LRU failure rate predictions when summing CCA failure rates, a Kei factor may be utilized. Each CCA may be assigned a Kei factor (range 0–1.0) which is estimated based on the observed fraction of the CCA failures (in the predecessor CCA or similar existing CCA used in the in-service database) that result in LRU failure. The total predicted LRU failure rate may then be determined by predicting the failure rate for each CCA, tabulating the Kei factor for each CCA, tabulating predicted LRU failure rate due to each CCA, and summing the CCA failure rates times Kei for all the CCAs. It should be appreciated that introducing a Kei factor is but one method to resolve top-down disconnect and is included herein not as limiting, but as purely exemplary.

The previous top-down approach calculations may be suitably performed using a processor, having algorithms and/or software stored thereon, manual computations, or any combination thereof. The field failure rates and MTBFs for the predecessor LRU CCAs and piece-parts may be suitably stored in a database (step 226) for subsequent retrieval as needed.

RAP system 200 is a useful tool in predicting the reliability of new equipment designed for in-field use by assessing the similarities and differences between the new equipment and the predecessor equipment. As just described, the top-down approach helps to determine the failure rates and MTBFs of the predecessor end item down to the CCA and piece-part level. This provides a detailed analysis of the predecessor end item and can be useful in predicting reliability for a new item. Thus, it is helpful to perform a comparative analysis of the similarities and differences between the predecessor item and the new design.

An assessment/analysis of the new design (step 216) is preferably completed before a similarity analysis can be accomplished. Parts and alternative parts data may be obtained from the new design BOM (step 218). The attributes for the new design are characterized (step 220) and may include some, none, or all of the previously mentioned attributes. The function(s) that the new design will perform are illuminated and reviewed (step 222). Once all data is presented in a comprehensive format, the similarity analysis between the predecessor part and the new design may begin.

The similarity analysis initiates with a comparison of the homogeneity between in-service predecessor designs and the new design (step 214). Existing field data from similar predecessor designs are compared to proposed end item designs to choose those that are most common. The identification/differentiation of new product configuration, and material and process elements to be represented in future production may be compared with the existing data. For example, the complexity of the new and old products (i.e., the number of parts), packaging differences, (i.e., higher density may lead to decreased reliability), and the attributes may all be compared. A hierarchy of identical hardware, similar hardware, similar technological approach and similar function may be used to determine the new design's top level MTBF.

Next, the similarity analysis quantifies the impact of the identified similarities and differences between the old and new designs (step 228). To accurately quantify, RAP system 200 may suitably use an appropriate algorithm, equation, calculation tool, spreadsheet, or any combination thereof. Based on the analysis, a degree of similarity may be computed (step 230). For example, a numerical percentage of similarity may be determined which represents an overall degree of similarity between the old and the new design.

A query may then be performed, either by a suitable software program, algorithm, manually, or a suitable equivalent, to determine if the degree of similarity meets a threshold level of similarity (step 232). The query may be, for example, "If the degree of similarity between the old design and the new design is at least 75% (difference is no greater than 25%), then the two designs are similar." The query determines which method of assessment would be appropriate based on, for example, the degree of similarity. In the present embodiment, RAP system 200 includes two methods used in characterizing the failure rate of the new in-service design. The similarity analysis is the preferred method and should be used whenever possible, or whenever the query determines that a sufficient degree of similarity exists between the old and the new designs. If, however, the degree of similarity fails to meet or exceed the threshold level, the similarity analysis may not be appropriate and an alternative method should be used (step 234).

Unlike the similarity analysis, an alternative method may perform a quantitative comparison of the new product under development with product(s) designed and produced, which may not be similar and/or used in a similar application, for which in-service reliability data is available. While there may not be a similar design in-service for which data exists, the alternative model may be applicable if there are similar parts types, circuits or functions within the fielded end item. The alternative method may be a model ("Failure Cause Model") and may assess a products reliability by use of failure rates for physical model categories (these will be discussed in detailed below).

The failure cause model may be applied at the CCA level, piece-part level or functional level (step 236). The field failure rate data analyzed for use in this method can be an aggregate compilation of all field data or a subset of the field data that is most applicable to the new products being assessed. Data is retrieved from a field failure rate database (step 238) as applicable to the new design under consideration. Separate field data may be warranted if major differences are observed in the types of and magnitudes of failure modes for the physical model categories. A more detailed description of the failure cause model is to follow.

Returning back to the query point (step 232), if the differences between the old and the new designs are less than the established threshold, the similarity analysis method continues. Depending on the application, it may not be necessary to perform failure rate predictions of the new design down to the CCA and piece-part level (step 240). If this is the case, RAP system 200 calculates only the end item (new design) failure rate and MTBF (step 242).

As described above, the failure rate of the new design end item may be computed (step 242) from failure data based on any appropriate data, including similarity of predecessor end items and/or similarity of predecessor components. Further attributes may also be considered, such as physical characteristics of the compared designs, performance requirements, technological maturity of the designs, improvements in subcomponents, the design processes involved, software considerations, manufacturing effectiveness, serviceability, and pre-production testing. The failure rate and MTBF of the new design end item are suitably stored in a database (step 238) for subsequent retrieval as needed.

RAP system 200 may, however, be configured to provide a more detailed failure rate prediction of the end item (new design). For example, failure rates at the CCA and piece-part levels may be desired for the end item (step 240). The failure data for the CCA and piece-part levels associated with the known or predecessor designs are retrieved from the appropriate database (arrow from box 226 to box 243). The predecessor data is suitably used for comparison with the predicted data corresponding to the CCA and piece-part levels of the new design (step 243). The failure rate and MTBF of the new design may then be predicted (calculated) using any appropriate method, such as, but not limited to, software programs, algorithms, equations, mathematical tools, and manual calculations and comparisons.

Both methods, similarity analysis and failure cause model, may use physical model categories for comparison between new and predecessor end-items or assemblies. For example, the physical model may be divided into categories which account for field failures due to components, design and manufacturing processes, product or supplier specific failure mechanisms or any other relevant category which may be of interest. RAP system 200 queries whether a failure rate model currently exists for the new design end item (step 244). If a relevant failure model has already been generated, the model is suitably updated with any new data (step 246). If, however, a failure model does not exist, the system is configured to generate or create a new failure model for future reference (step 248). The updated failure model or newly generated failure model is suitably stored on a MTBF/failure rate database (steps 250, 238) for subsequent retrieval as needed.

Generally, reliability predictions assume an exponential failure rate model where the failure rates are constant over time. Though not strictly true, it is generally a good approximation, particularly when dealing with an LRU made up of hundreds of component failure rates. There are two general cases, as part of the physical model categories, where the constant failure rate model may not be an appropriate model choice: (1) when the manufacturing and design failure rates are expected to have a failure rate which reduces over time; and (2) certain mechanisms which are expected to wearout during the aircraft's life will have a failure rate which increases over time (e.g., systems including light bulbs will have failure rates which increase over time). A Weibull distribution or Weibull failure rate model may be appropriate in these situations when failure rates are not constant over time. Weibull models and their applications are well known and may be found in most reliability text books, thus a detailed description will not be included in this document. It should be recognized, however, that if a Weibull model or the equivalent is used, data collection, computation, and predictions may be slightly varied from the physical models as described herein.

The final steps in RAP system 200 include generating an appropriate report expressing the MTBF and/or failure rate predictions. Depending on the particular application, the reporting process may take many different forms. For example, if a top-down approach is requested, failure rates and MTBFs at the CCA and piece-part level of the predecessor end item may be calculated, for which an end user may desire an appropriate report (step 252).

The similarity analysis method and alternate method, or failure cause model, may generate any appropriate reports containing the failure rate and/or MTBF for the new design end item, and may even report down to the CCA and piece-part levels (steps 254, 256). The report should include sufficient supporting detail, or references thereto, to allow the reader to understand the data sources and analysis processes used to obtain the results, and to understand the uses, any limitations, and any uncertainties of the results. For example, the report may include one or more of following data: a clear identification of the product or assembly for which the assessment is being performed (i.e., part number and revision level); identification of an analyst (if appropriate) performing the assessment; identification and definition of reliability metrics being assessed; description of product(s) for which in-service data is being used (i.e., predecessor data); summary of in-service data used in the similarity analysis (i.e., product identifier, calendar operating period, total field flight hours, total field operating hours, and failure quantities); any assumptions used in performing the assessment; and descriptions of all characteristic differences and a basis for the numerical evaluations of each characteristic difference against the physical model categories.

Reliability assessment results generated using the RAP system and methods of the present invention are usable for a variety of purposes. For instance, the reliability assessment results may be used to make design decisions, business and system architecture decisions regarding equipment and sub-assemblies, and as inputs to safety and certification analyses.

Moreover, the reliability assessment results may be used to improve the reliability assessment program (RAP) herein described by (1) improving the data, and/or (2) improving the equations, algorithms, and calculation methods. A verification process, for example as defined below, may be used to identify the need for enhancement or modification to the RAP or any subtier procedure.

The reliability assessment results may be verified, for example, by measuring in-service performance of all equipment for which reliability assessments are made, and for which in-service data are available. Verification may be performed when an adequate period of in-service history is accumulated on analyzed products and may vary among products, parts, and applications. The results verification may be performed by correlation of the in-service reliability data and experienced failure history with reliability analysis results in such areas as overall product reliability (LRU MTBF), assembly level failure rates, and in-service failure rates associated with component piece-parts and other end item failure causes not related to component piece-parts. Comparison may be performed for initial calibration of the analysis methods and periodically performed for re-calibration purposes.

A closer review of the two exemplary methods, similarity analysis and failure cause model, in accordance with a reliability assessment system of the present invention will now follow.

Similarity Analysis Method

Reliability assessment is preferably conducted using the similarity analysis method whenever possible. The similarity analysis method is a structured, quantitative comparison of the product under development with a similar product designed and produced in a similar application, for which in-service reliability data is available.

Figure 3:
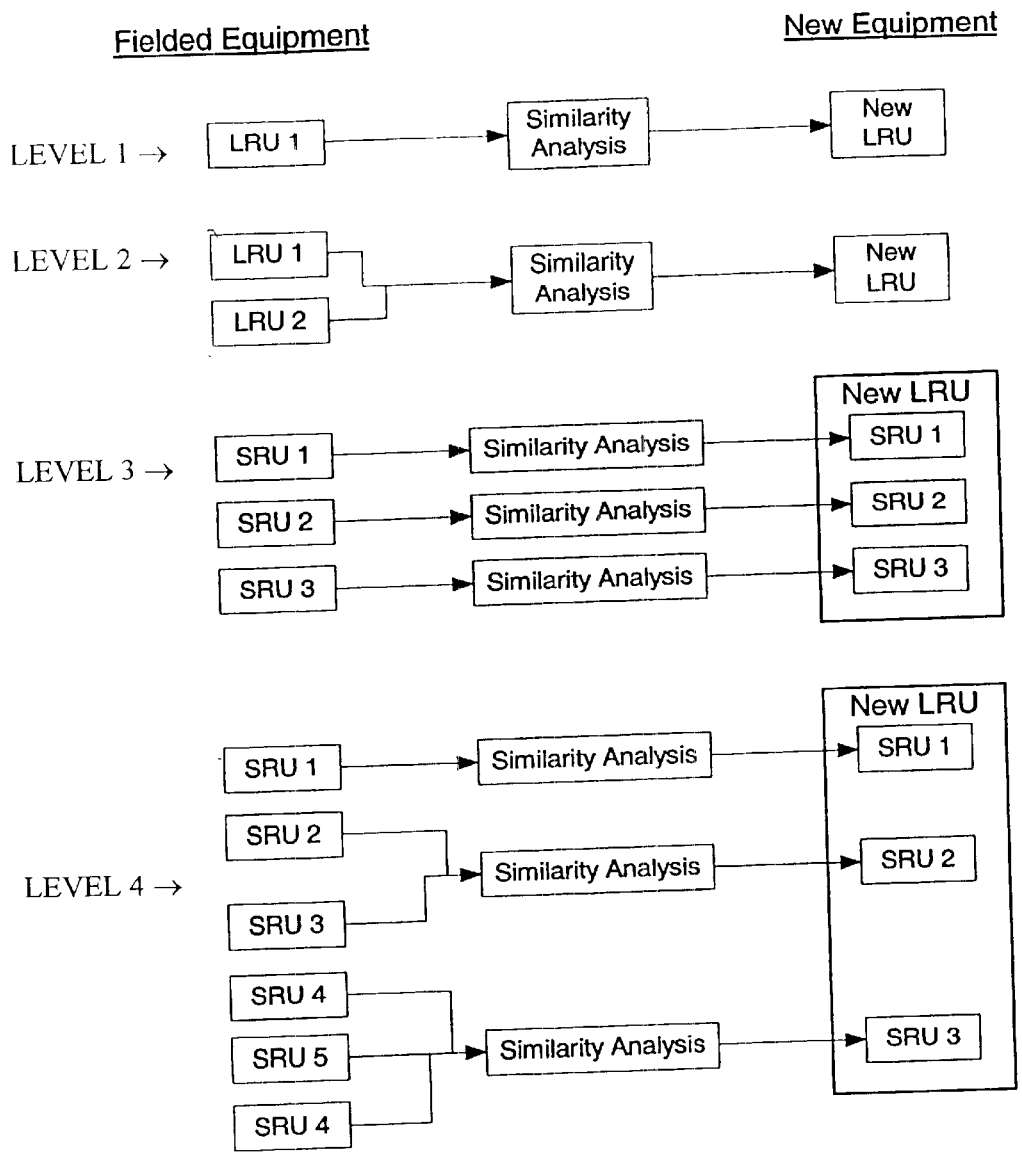
FIG. 3 illustrates, in block format, exemplary levels of a similarity analysis method according to one embodiment of the present invention.

Referring now to FIG. 3, exemplary levels of a similarity analysis are illustrated. The similarity analysis method suitably includes a variety of levels including the end item, CCA, piece-part, or functional levels, to compare the new product against one or more predecessor designs. For example, exemplary FIG. 3, in block format, depicts four levels of comparison that may be performed. Level 1 is the simplest comparison of one predecessor LRU to the new LRU. Level 2 may be a situation in which multiple predecessor LRUs are similar to the new LRU. Multiple similarity analyses can be performed, one for each predecessor LRU, with their individual results averaged to determine the resultant reliability for the new LRU. Level 3 may be a situation in which no similar predecessor LRUs are available but similar predecessor sub-assemblies e.g., CCAs, piece-parts, (SRUs) exist in different LRUs. Multiple similarity analyses can be performed, at the sub-assembly level, with their individual results summed to arrive at the reliability for the new LRU. Finally, Level 4 may be a similar situation to Level 3, with the exception that there may be multiple predecessor sub-assemblies to one new sub-assembly. Similarity analyses can be performed for each single predecessor sub-assembly to its corresponding new sub-assembly. Where multiple predecessor sub-assemblies correspond to a single new sub-assembly, the individual similarity analysis results can be averaged to determine the new sub-assembly reliability. The LRU reliability would be determined by combining the individual sub-assembly reliability values.

Figure 4:
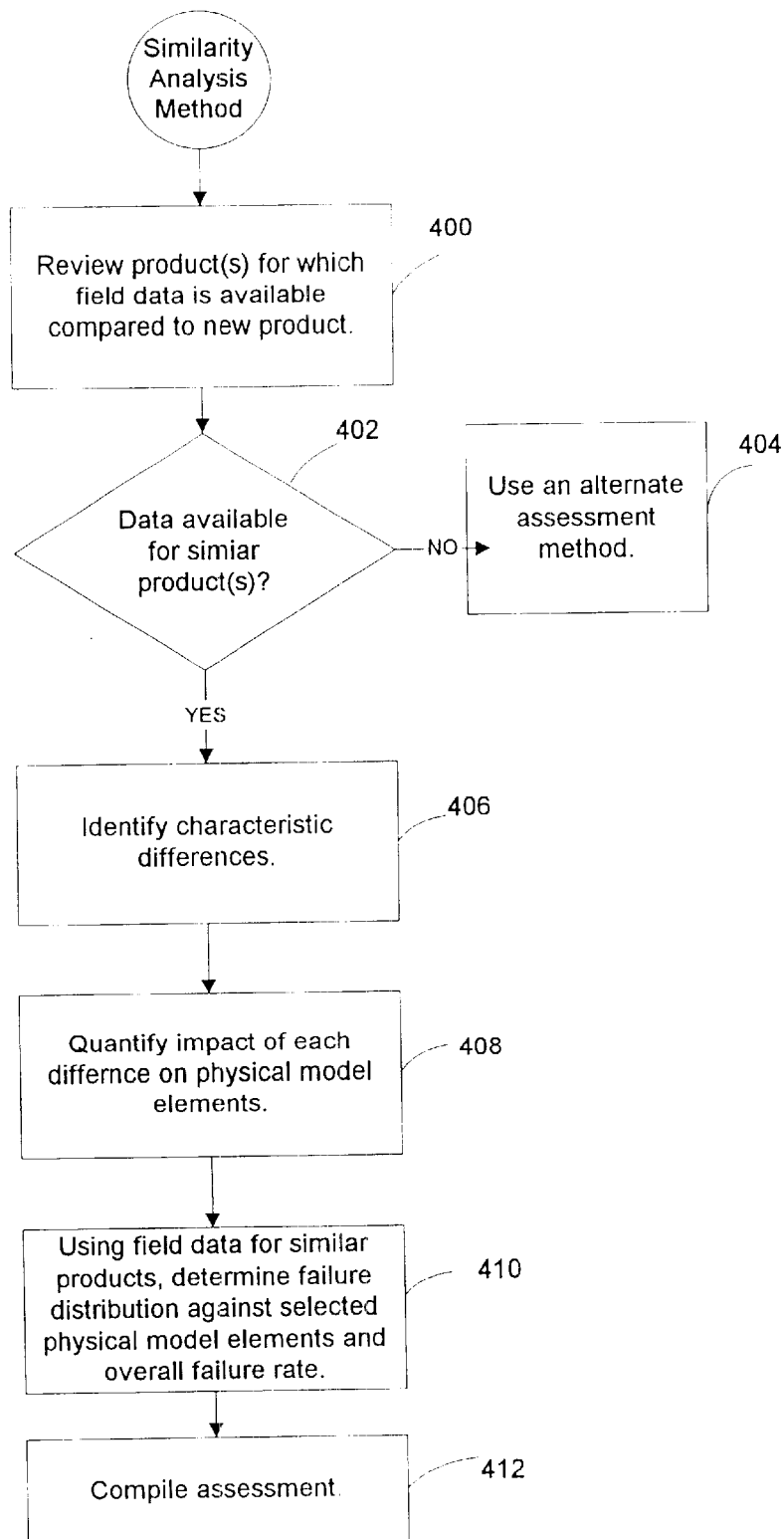
FIG. 4 illustrates an exemplary flow diagram of a similarity analysis method according to one embodiment of the present invention.

Referring now to FIG. 4, a high level flowchart of a similarity analysis process in accordance with the present invention is illustrated. Initially, a comparison of the new product with products for which field data exists is performed (step 400). The comparison may be at multiple levels and against single or multiple predecessor products as previously described with reference to FIG. 3. The comparison preferably identifies one or more end items or assemblies which are sufficiently similar to the new product, or its assemblies, such that comparable levels of reliability are anticipated. The process queries whether data is available to identify sufficiently similar end item(s) or assemblies (step 402). If similar end items or assemblies are not identified, then an alternate method for reliability assessment should be used (step 404), for example, the failure cause model described herein.

Next, the similarity analysis process identifies characteristic differences between the new and predecessor end item or assemblies (step 406). As previously mentioned, characteristics such as design process, manufacturing process, and product specifics can impact the physical model. Each characteristic difference is evaluated relative to the expected reliability difference between the new and predecessor item (step 408). This evaluation is quantified relative to the individual physical model categories. For example, in one particular embodiment of the present invention, if no impact is expected for a particular combination of characteristic difference and category, a "1" may be assigned. Differences which are expected to improve reliability may be assigned a numerical value less than one and differences which are expected to degrade reliability may be assigned a value greater than one.

The field data for existing and similar products is used to determine failure distribution against selected physical model elements and overall failure rates (step 410). The field failure data is suitably compiled in a manner to provide, for example, two pieces of information: (1) a failure mode percent distribution, by physical model category and (2) an overall failure rate. For the failure mode distribution, the cause for all field failures of the end item or assembly are assigned to one of the physical model categories. The failure quantity in each category is then divided by the total failure count to quantify the percent contribution of each category, to the total end item or assembly failure quantity.

The results from the data may be compiled to determine the predicted new product failure rate for the new end item (step 412). Compilation may include resolution of top-down disconnects (if any) in the field database for the predecessor end item. It should be noted that any of the steps performed in the similarity analysis process may be completed using software, manual entry, algorithms, spreadsheets, or any equivalent thereof.

In one exemplary embodiment, appropriate data or calculation from each of the above steps is entered into a spreadsheet and the new product failure rate may be determined using a suitable spreadsheet program, e.g., Quattro-Pro and MICROSOFT EXCEL. The failure rate for the new end item may be calculated by taking the product of the field failure rate for the predecessor end item (which may include the summation of the field failure rates for each of the sub-assemblies of the end item) and the failure rate ratio. The failure rate ratio may be suitably computed by summing all the failure rate impact ratios as computed for each of the physical model categories (i.e., the product of a numerical entry for each characteristic differences (step 408)).

Failure Cause Model

Reliability assessment may be performed using an alternate method if the similarity analysis method is not appropriate, for example, a failure cause model may be employed. The failure cause model is a structured, quantitative comparison of the product under development with product(s) designed and produced for which in-service reliability data is available. This method uses physical model categories which may be the same or substantially the same as the physical model categories used by the similarity analysis method.

Figure 5:
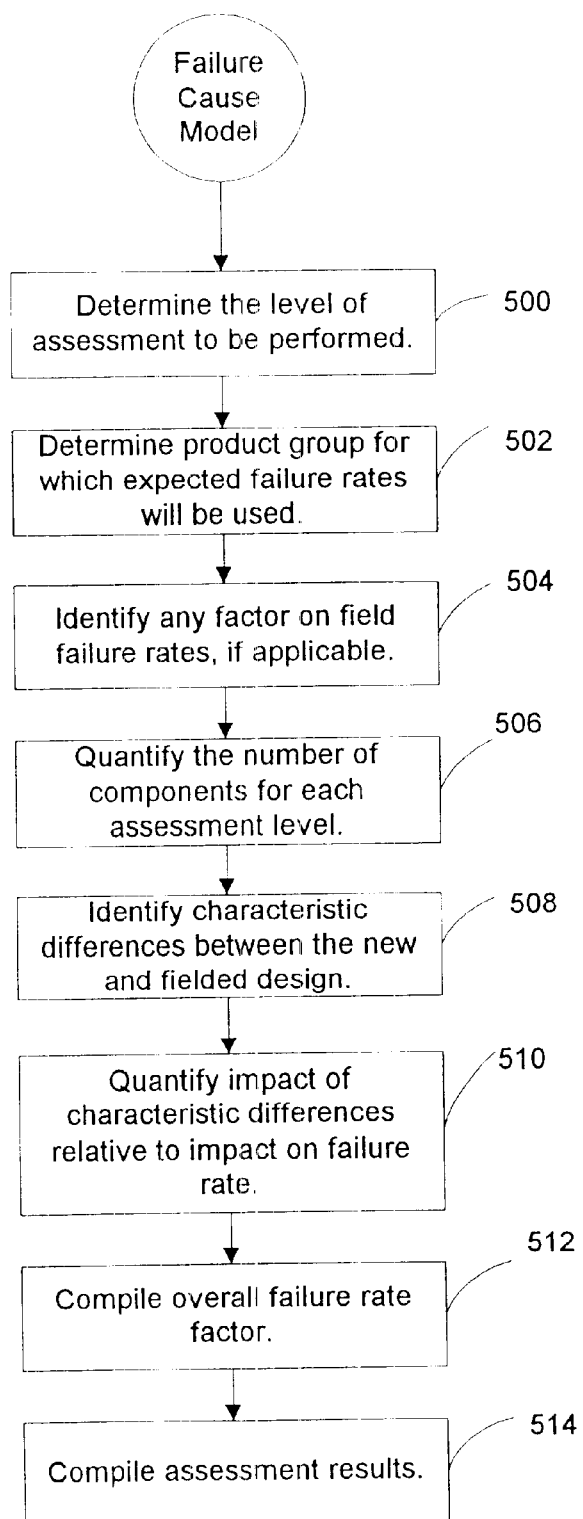
FIG. 5 illustrates a flow diagram of a failure cause model method according to one embodiment of the present invention.

Referring now to FIG. 5, a high level flowchart of a failure cause model in accordance with the present invention is illustrated. Initially, the level at which the assessment is to be performed, i.e., system, LRU, sub-assembly, may be determined (step 500). The intended use of the reliability assessment may dictate the level at which the assessment is to be performed. For example, assessment which results in sub-assembly level reliability would be desirable if sub-assembly sparing (spare parts on hand) level were one of the required uses. Next, the product group(s) for which expected failure rates may be used is determined (step 502). Though high levels of similarity are not required for use of the failure cause model method, greater similarity generally improves assessment accuracy by reducing variability between the new and predecessor equipment's failure rates.

Once the product(s) groups are selected, the category failure rates may be determined. For example, failure rates may be categorized as follows: passive parts (capacitors, resistors, etc.); discrete semiconductors (diodes, transistors); low complexity integrated circuitry; high complexity integrated circuitry (ASICs, memory chips, processor chips); interconnections; and others as appropriate. As previously described, on occasion, the field data may indicate failures of more than one CCA (or sub-assembly) associated with a single end item failure. Thus, when the observed failure rates for all CCAs in an end item are summed, the total failure rate may be greater than the observed failure rate for the end item itself, or a top-down disconnect may occur. Various methods may be utilized to account for a top-down disconnect, e.g. using a Kei factor.

When conducting reliability predictions for new product CCAs and end items using the failure cause model, the accuracy of the predictions will generally depend upon the accuracy of the piece-parts failure rates used, e.g., for the physical model categories described herein. Since piece-part failure rates are usually very low, a relatively large field database (e.g., capable of covering millions of part hours, with several observed failures for each part category) may be needed to obtain high confidence level failure rates. Such large parts field databases may be difficult to obtain; therefore, data for a mixture of different CCAs and/or end items may be combined in order to obtain a sufficiently large parts database. When the data is mixed, the failure rates obtained usually represent an average base failure rate rather than failure rates directly applicable to a specific functional or CCA application. Moreover, the base failure rates may tend to be optimistic, since not all CCA failures may have been troubleshooted or isolated down to the piece-part level, and thus, some parts failures may bot have been counted.

When average base piece-parts failure rates are used for predicting the reliability of new product CCAs or end items, as in the failure cause model, the base failure rate is preferably adjusted for the specific application. Parts failure rates may vary significantly between, for example, linear vs. digital applications, high voltage v. low voltage applications, and high power vs. low power applications. Use of a Kcca adjustment factor may provide more accurate parts failure rates, adjusted to include CCA effects, design application, and stresses, and also to account for effects of any non-isolated CCA failures that may have been present in the database. For example, if the total CCA failure rate (obtained by performing a parts count failure rate prediction for the CCA by multiplying parts base failure rates by quantities used for each part type and then summing the failure rates) does not equal the actual observed CCA failure rate obtained from field data, then this indicates that the parts base failure rates should be adjusted, up or down, to obtain agreement. The Kcca adjustment factor can be calculated by dividing the observed CCA failure rate by the total CCA failure rate using parts base failure rates. All parts base failure rates can then be multiplied by the Kcca factor to obtain the adjusted failure rates for each part type, and the adjusted parts failure rates may now be used for predicting the reliability of the new product CCA. It should be recognized that an appropriate adjustment factor, e.g., the Kcca factor disclosed herein, may be used in various other assessment methods when disconnects are present, such as the similarity analysis method of the present invention.

With continued reference to FIG. 5, generally the category failure rates (as determined in step 502) can be directly applied to the new product, however, there may be instances where the failure rates require factoring (step 504). An example of factoring is when the new product is intended for a different environment. In these instances, the failure rates may be factored with a description of the factoring and its basis included in the assessment report. Some differences that could justify factoring the component failure rates include, but are not limited to, use environment, duty cycle, repair environment, field application, expected life vs. required life, customer training, technology maturity, and part quality. This "failure rate factor" is generally applicable for component parts and may be a single factor for all component categories or may vary by category.

Next, the number of components are quantified (step 506), by type, for each of the assembly levels (as identified in step 500). The component quantities may be placed into one of the physical model component categories, as previously detailed.

The characteristic differences between the new and fielded hardware are then identified (step 508). As previously mentioned, characteristics such as design process, manufacturing process, and product specifics can impact the manufacturing and design failure rates. Additionally, any significant differences in the complexity of the new product, e.g., parts count, CCA count, packaging density, compared to average complexity of existing product(s) used in the failure rate database are identified and evaluated to the extent that they may have impact on the failure rates. The impact of each characteristic difference on the failure rate is then quantified (step 510). For example, in one embodiment of the present invention, characteristic difference that are expected to improve reliability may be given values less than one and those expected to reduce reliability may be given values greater than one.

The results from the data may be compiled to determine the overall impact on the manufacturing and design failure rates (step 512). Finally, the projected MTBF is computed (step 514). It should be noted that any of the steps performed in the failure cause model may be completed using software, manual entry, algorithms, spreadsheets, or any equivalent thereof. For example, in one exemplary embodiment, appropriate data or calculation from each of the above steps is entered into a spreadsheet and the MTBF may be determined using a suitable spreadsheet program, e.g., QuattroPro and MICROSOFT EXCEL.

The present invention has been described above with reference to exemplary embodiments. However, those skilled in the art having read this disclosure will recognize that changes and modifications may be made to the embodiments without departing from the scope of the present invention. For example, various modifications may be made to the two methods for assessment. For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical reliability assessment system. These and other changes or modifications are intended to be included within the scope of the present invention, as expressed in the following claims.

What is claimed is:

1. A reliability assessment program (RAP) system of the type including a plurality of data pertaining to a new end item and a database having a plurality of field failure history stored thereon, said field failure history pertaining to an in-field end item, said RAP system comprising:

an in-field data source for an in-field end item, said in-field data source having a data collecting system for gathering said field failure history;

a processor configured to receive said field failure history for said in-field end item and to receive said data pertaining to said new end item, said processor configured to determine a failure rate of said new end item in accordance with an assessment method selected upon a determination of a degree of similarity between said in-field end item and said new end item; and an output interface configured to provide the failure rate in a readable format.

2. The RAP system of claim 1 wherein said in-field end item comprises an aircraft end item.

3. The RAP system of claim 1 wherein said processor being configured to calculate a failure rate of said in-field end item.

4. The RAP system of claim 3 wherein said in-field end item comprises a plurality of sub-assemblies.

5. The RAP system of claim 4 wherein said processor being configured to calculate a failure rate of each of said sub-assemblies and said failure rate of said in-field end item comprising a summation of said failure rates of each of said sub-assemblies.

6. The RAP system of claim 5 wherein said failure rate of said in-field end item is stored on said database.

7. The RAP system of claim 1 wherein said degree or similarity comprises a numerical percentage representing an overall assessment of similarity between said in-field end item and said new end item.

8. The RAP system of claim 1 wherein said determination of a degree of similarity comprises a threshold level of similarity.

9. The RAP system of claim 1 comprising two assessment methods.

10. The RAP system of claim 9 comprising a similarity analysis method and a failure cause model method, if said degree of similarity meets or exceeds said threshold level, then said similarity analysis method is selected.

11. The RAP system of claim 10 wherein said similarity analysis method comprises a plurality of levels wherein at least one of said levels is used to compare said in-field end item with said new end item in order to determine said failure rate of said new end item.

12. The RAP system of claim 1 wherein said new end item comprises a plurality of sub-assemblies and said failure rate of said new end item comprises a summation of a failure rate of each of said sub-assemblies.

13. A reliability assessment and prediction system comprising:

a data collection means for gathering a plurality of in-service field failure data for an in-service end item;

a data collection means for gathering a plurality of design data for a new end item;

a processing means for calculating a failure rate for said in-service end item using said in-service field failure data, for comparing said in-service field failure data for said in-service end item to said design data for said new end item, and for determining a degree of similarity between said in-service end item and said new end item;

an assessment means for calculating a failure rate prediction of said new end item; and a reporting means for generating a report expressing the failure rate prediction.

14. The reliability assessment and prediction system of claim 13 wherein said data collection means comprises a software tool capable of accessing a database having said in-service field failure data stored thereon.

15. The reliability assessment and prediction system of claim 14 wherein said software tool being configured to determine if said database includes an in-service end item which is substantially similar to said new end item.

16. The reliability assessment and prediction system of claim 13 wherein said assessment means comprises a similarity analysis method and a failure cause model method.

17. A method for a reliability assessment and a failure rate prediction of a new design end item, said method comprising the steps of:

collecting a plurality of in-service field failure data pertaining to a predecessor end item;

comparing said in-service data to a plurality of new design data pertaining to said new design end item;

identifying a plurality of similarities and differences between said in-service data and said new design data;

determining a method of assessment based on a degree of similarity between said predecessor end item and said new design end item; and calculating said failure rate prediction of said new design end item according to said method of assessment.

18. The method for a reliability assessment and a failure rate prediction of claim 17 wherein said collecting of said in-service field failure data comprises the steps of:

recording said in-service field failure data in a retrievable database;

accessing said in-service field failure data to determine if said predecessor end item is similar to said new design end item;

verifying said in-service field failure data for accuracy; and determining whether said in-service field failure data is relevant.

19. The method for a reliability assessment and a failure rate prediction of claim 18 wherein said new design end item comprises an aircraft end item and said collecting step further comprises collecting field flight hour data.

20. The method for a reliability assessment and a failure rate prediction of claim 17 further comprising the step of calculating a failure rate of said predecessor end item using said in-service field failure data.

21. The method for a reliability assessment and a failure rate prediction of claim 20 wherein said predecessor end item comprises a plurality of sub-assemblies and said calculating a failure rate of said predecessor end item comprises calculating a failure rate for each sub-assembly.

22. The method for a reliability assessment and a failure rate prediction of claim 21 further comprising the steps of:

summing the failure rates from each sub-assembly; and compensating for disconnects occurring when the summing step does not equal said failure rate of said predecessor end item.

23. The method for a reliability assessment and a failure rate prediction of claim 17 further comprising the step of generating a report expressing said failure rate prediction.

24. The method for a reliability assessment and a failure rate prediction of claim 23 wherein said step of generating a report comprises expressing a mean-time-between-failure (MTBF).

25. The method for a reliability assessment and a failure rate prediction of claim 17 further comprising the step of assessing said new design end item to gather a plurality of new design data.

26. The method for a reliability assessment and a failure rate prediction of claim 25 wherein said assessing step comprises the steps of:

determining a parts list of said new design end item;

characterizing a plurality of attributes of said new design end item; and determining a function of said new design end item.

27. The method for a reliability assessment and a failure rate prediction of claim 17 further comprising the step of computing said degree of similarity between said predecessor end item and said new design end item.

28. The method for a reliability assessment and a failure rate prediction of claim 27 wherein said computing step comprises the steps of:

quantifying an impact of said similarities and differences; and based on the quantifying step, computing a numerical percentage of similarity representing said degree of similarity between said predecessor end item and said new design end item.

29. The method for a reliability assessment and a failure rate prediction of claim 17 further comprising the step of querying whether said degree of similarity meets a threshold level of similarity, said querying step performed prior to said determining step.

30. The method for a reliability assessment and a failure rate prediction of claim 17 wherein said determining step comprises determining between two methods of assessment.

31. The method for a reliability assessment and a failure rate prediction of claim 30 wherein said determining step comprises determining between a similarity analysis method and a failure cause model method.

32. The method for a reliability assessment and a failure rate prediction of claim 17 wherein said calculating step comprises use of a physical model category for comparison between said predecessor end item and said new design end item.

33. The method for a reliability assessment and a failure rate prediction of claim 17 wherein said determining step determines a similarity analysis method of assessment based on a high degree of similarity.

\* \* \* \* \*